United States Patent

Ishikawa et al.

[11] Patent Number: 5,816,733
[45] Date of Patent: Oct. 6, 1998

[54] ROTARY MEMBER HAVING A COVER SECURING STRUCTURE

[75] Inventors: Satoshi Ishikawa; Hiroaki Iizuka; Yasutaka Nagaoka, all of Shizuoka-ken, Japan

[73] Assignee: Yazaki Corporation, Tokyo, Japan

[21] Appl. No.: 755,824

[22] Filed: Nov. 26, 1996

[30] Foreign Application Priority Data

Nov. 29, 1995 [JP] Japan .................................... 7-311016

[51] Int. Cl.⁶ ...................................................... F16B 5/06
[52] U.S. Cl. .......................... 403/329; 403/13; 403/326; 24/293; 242/378.1
[58] Field of Search ................................... 403/329, 326, 403/289, 13, 14, 315, 316, 319; 242/378.1, 378.3; 24/293, 94, 114, 113 MP; 191/12.4; 439/352, 680, 681

[56] References Cited

U.S. PATENT DOCUMENTS

| | | | |
|---|---|---|---|
| 3,023,394 | 2/1962 | Hubbell | 439/681 X |
| 3,560,908 | 2/1971 | Dell et al. | 439/680 X |
| 3,711,816 | 1/1973 | Schumacher | 439/352 |
| 3,785,584 | 1/1974 | Crellin, Jr. | 403/329 X |
| 4,043,685 | 8/1977 | Hyams | 403/326 X |
| 4,211,461 | 7/1980 | Wescott | 439/352 X |
| 4,721,248 | 1/1988 | Chow | 403/289 X |
| 4,756,640 | 7/1988 | Gehrke | 403/326 |
| 5,172,540 | 12/1992 | Wernli et al. | 403/329 X |
| 5,275,575 | 1/1994 | Cahaly et al. | 439/680 X |
| 5,309,950 | 5/1994 | Bassi et al. | 403/329 X |
| 5,484,223 | 1/1996 | Saito | 403/326 X |

FOREIGN PATENT DOCUMENTS

| | | |
|---|---|---|
| 4-11541 | 1/1992 | Japan . |
| 6-338371 | 12/1994 | Japan . |
| 2262963 | 7/1993 | United Kingdom ................... 403/289 |
| 8402560 | 7/1984 | WIPO ..................................... 403/13 |

*Primary Examiner*—Harry C. Kim
*Attorney, Agent, or Firm*—Finnegan, Henderson, Farabow, Garrett & Dunner, L.L.P.

[57] ABSTRACT

A cover securing structure for securing a cover to an end surface of a cylindrical member having a plurality of engaging projections each having a hook portion and projecting over a contact surface of the cover with which the cover is brought into contact with the end surface of the cylindrical member, locating projections in the form of two parallel arms apart from each other for a predetermined distance and projecting over the contact surface in the regions among the plural engaging projections, accommodating grooves formed in the end surface of the cylindrical member at positions corresponding to the engaging projections, and accommodating grooves formed in the end surface of the cylindrical member at positions corresponding to the locating projections, wherein the hook portions of the engaging projections are formed to face the inner surface of the cylindrical member, the accommodating grooves have lock portions for receiving and locking the hook portions, and the accommodating grooves have ribs each having a width so as to be engaged to the gap between the two parallel arms.

10 Claims, 4 Drawing Sheets

ROTARY MEMBER HAVING A COVER SECURING STRUCTURE

BACKGROUND OF THE INVENTION

The present invention relates to a cover securing structure, and more particularly to a cover securing structure for securing a cover to an end surface of a cylindrical body, such as a reel connection unit for establishing the connection between members which are rotated relatively such that members disposed concentrically on one axis and arranged to rotate relatively are electrically connected through a flat cable.

Hitherto, establishment of the electrical connection between a member secured to one shaft and another member arranged to rotate around the shaft or transmission of signals between the same is sometimes required. For example, a portion of automobiles of a type having a progressed electronic control system has various switches and electronic parts, such as an air bag, provided for the steering wheel portion of a steering unit thereof. The switches and electronic parts must be connected to the steering column portion through electric wiring. Since the steering wheel is set to be capable of rotating to the right and left finite times, that is, plural times, a brush must be provided between the steering shaft and the steering column or a flexible cable capable of following the rotation of the steering shaft, which generally is a flexible flat cable having a plurality of conductive wires, must be provided in order to establish the electrical connection between the steering wheel and the steering column.

The structure for establishing the electrical connection between the steering shaft and the steering column has a problem of unsatisfactory reliability because the brush is a contact of a mechanical sliding type. Accordingly, a brushless and reel type connection unit comprising a flat cable has been suggested.

The reel type connection unit has a flat cable disposed between a rotary body secured to a steering shaft and a fixed body secured to the steering column portion. The rotary body has an inner cylindrical portion, while the fixed body has an outer cylindrical portion for surrounding the inner cylindrical portion while being apart from the inner cylindrical portion for a predetermined distance. The flat cable is accommodated in an annular space between the inner cylindrical portion and the outer cylindrical portion while being wound along the annular space.

The fixed body is provided with a cover member for covering the upper portion of the space and the outer periphery of the outer cylindrical portion. The cover member comprises an upper cover for covering the upper portion of the space and a cylindrical portion for surrounding the outer periphery of the outer cylindrical portion, the cover member being attached to the fixed body in such a manner that its rotation with respect to the fixed body is inhibited. The upper cover has an opening in the central portion thereof. An external connection cover is rotatively disposed on the cover member. The external connection cover is secured to the inner cylindrical portion through an opening of the cover member.

The external connection cover is secured to the inner cylindrical portion such that a plurality of through holes are formed in a portion of the external connection cover which comes in contact with the inner cylindrical portion; tapping screws are inserted into the through holes; and the screws are tightened up at a position above the external connection cover. Therefore, the tapping screws are required and therefore the number of elements is enlarged excessively. Moreover, the process for tightening the tapping screw is required, causing the cost to be enlarged.

SUMMARY OF THE INVENTION

In view of the foregoing, an object of the present invention is to provide a cover securing structure capable of attaching a cover to an end surface of a cylindrical member, such as a reel type connection unit for connecting members which are rotated relatively, without tapping screws and requiring simple operation.

In order to achieve the foregoing object, according to one aspect of the present invention, there is provided a cover securing structure for attaching a cover to an end surface of a cylindrical member, comprising: plural engaging projections projecting over a contact surface of the cover brought into contact with the end surface of the cylindrical member, having a hook portion at the leading end thereof; locating projections projecting over the contact surface in the regions among the plural engaging projections; engaging projection accommodating grooves formed in the end surface of the cylindrical member at positions corresponding to the engaging projections so as to accommodate and caused to be engaged to the engaging projections; and locating projection accommodating grooves formed in the end surface of the cylindrical member at positions corresponding to the locating projections so as to accommodate the locating projections.

The locating projections may be parallel arms in the form of a pair stood erect apart from each other for a predetermined distance, the engaging projection accommodating grooves have lock portions formed in the inner surface of the cylindrical member to receive and lock the hook portions; and each of the locating projection accommodating grooves has a rib having a width so as to be engaged to the gap between the pair of parallel arms of the locating projections.

The engaging projections, the locating projections, the engaging projection accommodating grooves and the locating projection accommodating grooves may be formed at positions or into shapes to permit the engaging projections to be accommodated in the engaging projection accommodating grooves and to permit the locating projections to be accommodated in the locating projection accommodating grooves only when the cover has been attached to the cylindrical member at a predetermined position.

DESCRIPTION OF THE PREFERRED EMBODIMENTS

An embodiment of a structure for securing a cover according to the present invention will now be described with reference to FIGS. 1 and 4 in which the structure for securing a cover is employed to secure an external connection cover for a reel type connection unit.

Figure 4:
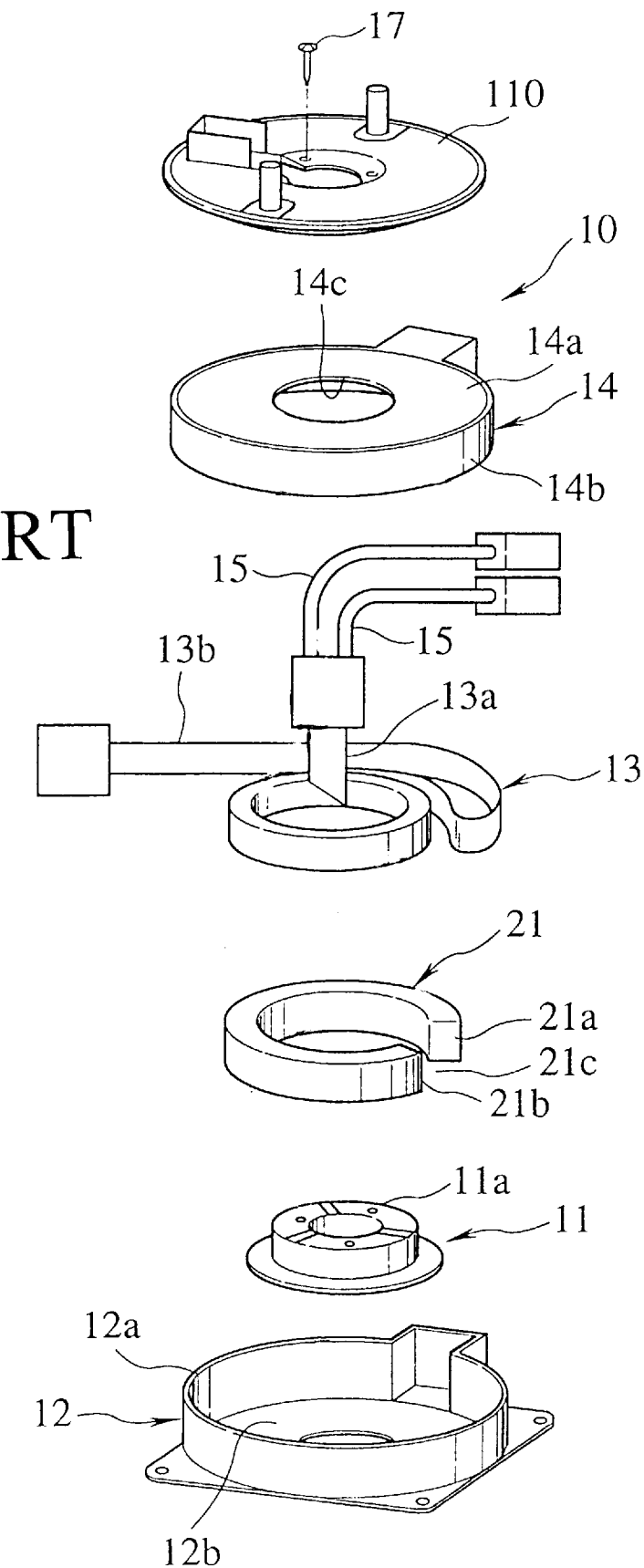
FIG. 4 is an exploded perspective view showing the structure of a reel type connection unit for connecting members which are rotated relatively.

As shown in FIG. 4, a reel-type connection unit 10 has a rotary body 11, a fixed body 12, a flexible flat cable 13 and a movable member 21.

The rotary body 11 has an inner cylindrical member 11a, while the fixed body 12 has an outer cylindrical member 12a for surrounding the inner cylinder 11a at a predetermined distance. The flat cable 13 is accommodated in an annular space between the inner cylindrical member 11a and the outer cylindrical member 12a in such a manner that the flat cable 13 is placed along the annular space while being folded back at an intermediate position thereof to form a vortex shape. An inner end 13a and an outer end 13b of the flat cable 13 respectively are held by the inner cylindrical member 11a and the outer cylindrical member 12a. The movable member 21 is disposed movably along the annular space and formed into a C-shape having an opening 21c at which the flat cable 13 is folded back.

The fixed body 12 has a cover member 14 for covering the upper portion of the annular space and the periphery of the outer cylindrical member 12a. The cover member 14 comprises an upper cover member 14a for covering the upper portion of the annular space and a cylindrical member 14b for surrounding the outer cylindrical member 12a, the cover member 14 being attached to the fixed body 12 in such a manner that rotation of the cover member 14 with respect to the fixed body 12 is inhibited. In a central portion of the upper cover member 14a, there is formed an opening 14c. The fixed body 12 has a lower cover 12b for covering the lower portion of the annular space, the lower cover 12b being formed integrally with the outer cylindrical member 12a.

An external connection cover 110 is rotatively provided on the cover member 14. The external connection cover 110 is connected to the inner cylindrical member 11a through the opening 14c of the cover member 14 so as to hold the connection portion between the inner end 13a of the flat cable 13 and cables 15.

The rotary body 11 is connected to, for example, a steering wheel portion (a steering shaft) of an automobile, while the fixed body 12 is connected to a steering column of the same.

In the reel-type connection unit 10 having the above-mentioned structure and capable of establishing the connection between members which are rotated mutually, counter-clockwise rotation of the inner cylindrical member 11a when viewed in FIG. 4 causes the flat cable 13 to be moved in such a manner that the flat cable 13 is wound around the inner cylindrical member 11a. Therefore, a portion of the flat cable 13 positioned on the outside of the movable member 21 is brought into contact with an outer surface 21e of the movable member 21, and then folded back while being brought into contact with the opening end 21a. As a result, the flat cable 13 is introduced into the inside portion of the movable member 21 so that the flat cable 13 is wound around the inner cylindrical member 11a. At this time, the opening end 21a of the movable member 21 is pushed by the flat cable 13 so that the movable member 21 is rotated counterclockwise.

When the inner cylindrical member 11a is rotated clockwise when viewed in FIG. 4, the flat cable 13 wound around the inner cylindrical member 11a is rewound so that the flat cable 13 is moved to the surrounding portions. As a result, the flat cable 13 wound around the inner cylindrical member 11a is brought into contact with the inner surface of the movable member 21, and then folded back while being brought into contact with the other opening end 21b. Thus, the flat cable 13 is moved to the outside of the movable member 21, and then brought into contact with the inner surface of the outer cylindrical member 12a. At this time, the opening end 21b is pushed by the flat cable 13 so that the movable member 21 is rotated clockwise.

The structure for securing the external connection cover 110 to the rotary body 11 will now be described.

Figure 1:
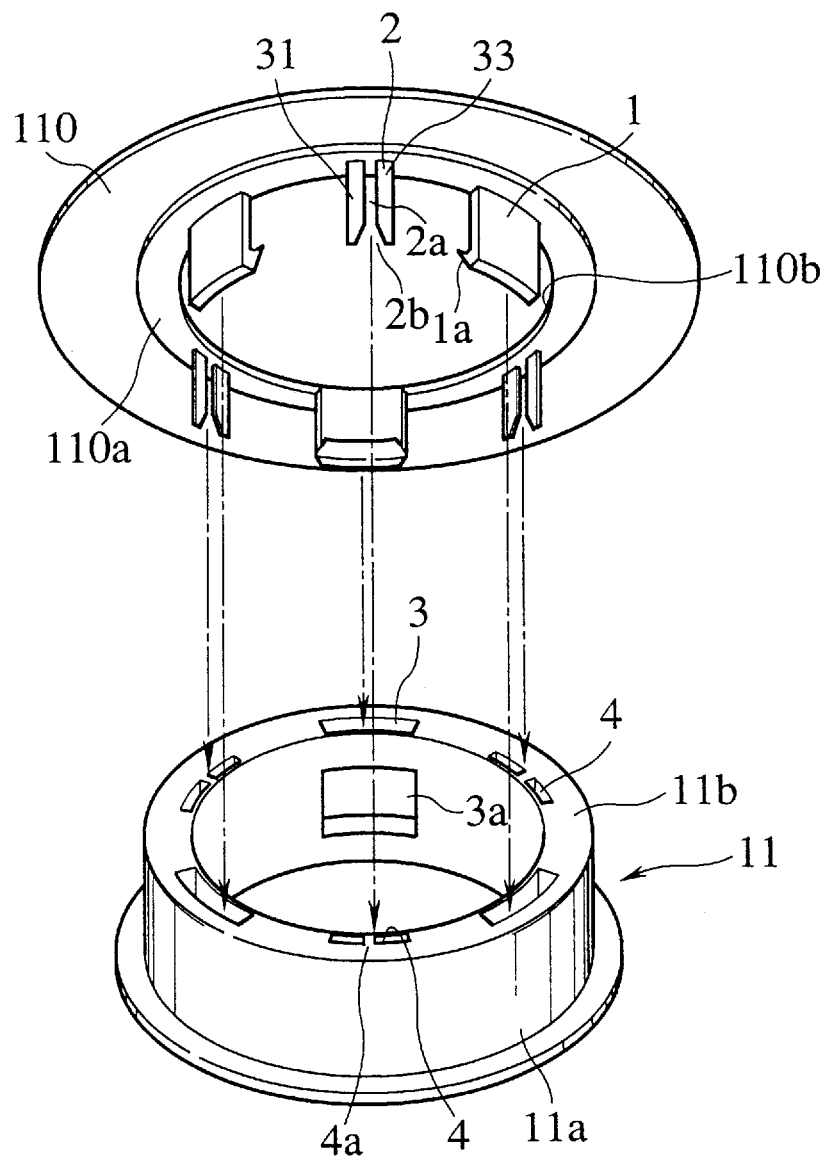
FIG. 1 is a perspective view showing an assembling state of an embodiment of a structure for securing a cover to an end surface of a cylindrical member according to the present invention.

As shown in FIG. 1, the inner cylindrical member 11a has a predetermined wall thickness. The external connection cover 110 is formed into an annular shape having an opening 110b, the diameter of which is substantially the same as the inner diameter of the inner cylindrical member 11a. An annular contact surface 110a is provided for the inner periphery of the reverse side of the external connection cover 110, the contact surface 110a projecting over the outer end of the external connection cover 110 and made to be in contact with a top end surface 11b of the inner cylindrical member 11a.

The contact surface 110a has engaging projections 1. In this embodiment, three engaging projections 1 each having a hook portion 1a at the leading end thereof are formed at the same intervals. The hook portion 1a of each of the engaging projections 1 is formed on the inner surface of the inner cylindrical member 11a. The engaging projections 1 are formed on a concentric circle (at positions in the circumferential direction of the opening 110b) with respect to the center of the disc-like external connection cover 110. Also the wall surface of the engaging projections 1 is formed into a curved surface along the concentric circle.

Figure 3A:
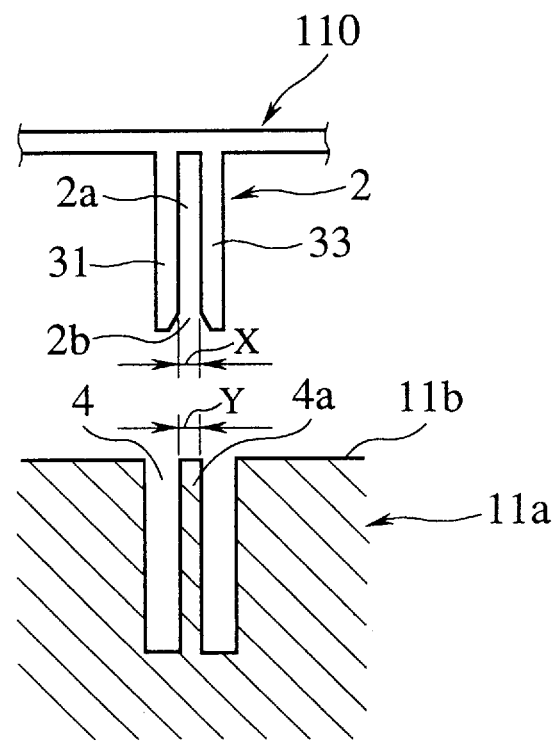
FIG. 3A is a partially enlarged cross sectional view showing intersection of the locating projections and a rib provided in the locating projection accommodating groove.

A locating projection 2 is formed on a contact surface 110a of each of the regions (three regions) between adjacent engaging projections 1. As shown in FIG. 3A in detail, each of the locating projections 2 comprises two parallel arms 31 and 33 apart from each other for a predetermined distance X. A gap 2a is formed between the parallel arms 31 and 33, the arm 2a having a leading end formed into an expanded portion 2b formed by expanding the gap 2a.

On the other hand, engaging-projection accommodation grooves 3 are formed in the top end surface 11b of the inner cylindrical member 11a at positions corresponding to the engaging projections 1, and locating projection accommodation grooves 4 are formed at positions corresponding to the locating projections 2. The bottom portion of each of the engaging-projection accommodation grooves 3 is bent and opened to face the inner portion of the inner cylindrical member 11a, the bent portion forming a lock portion 3a for receiving and locking the hook portion 1a of the engaging projections 1. If the hook portion 1a of the engaging projections 1 is short, the lock portion 3a may be a recess formed in the inner surface of the engaging-projection accommodation groove 3. As shown in FIG. 3A, a rib 4a having width Y so as to be adaptable to gap X between the two parallel arms 31 and 33 of the locating projections 2 is formed between the locating projection accommodation grooves 4.

The width Y of the rib 4a is determined to be not greater than the gap X (Y=X) between the arms 31 and 33 and approximate the X between the parallel arms 31 and 33 as much as possible so that engagement is established without rattling in the circumferential direction of the external connection cover 110 when the locating projections 2 have been inserted into the locating projection accommodation grooves 4. An expanded portion 2b formed by expanding the gap 2a is formed at the leading end of the gap 2a of the parallel arms 31 and 33. Thus, the locating projections 2 can easily be inserted into the locating projection accommodation grooves 4 attributable to the expanded portion 2b.

The three engaging projections 1, the locating projections 2, the engaging-projection accommodation grooves 3 and the locating projection accommodation grooves 4 have shapes in such a manner that the engaging projections 1 are accommodated in the engaging-projection accommodation grooves 3 in only a case where the external connection cover 110 is attached to the inner cylindrical member 11a at a predetermined position, that is, in only a predetermined state. For example, the width of one of the three engaging projections 1 is made to be smaller than that of the other engaging projections 1 and the engaging-projection accommodation groove 3 corresponding to the engaging projection 1 is made to be smaller so that the external connection cover 110 and the inner cylindrical member 11a is engaged to each other in only one state. As a result, the operation for aligning the external connection cover 110 with respect to the inner cylindrical member 11a can easily be completed and erroneous attachment in terms of the position can be prevented.

As an alternative to this, an alignment mark may be provided for a position at which the inner cylindrical member 11a and the external connection cover 110 are superimposed.

Figure 2A:
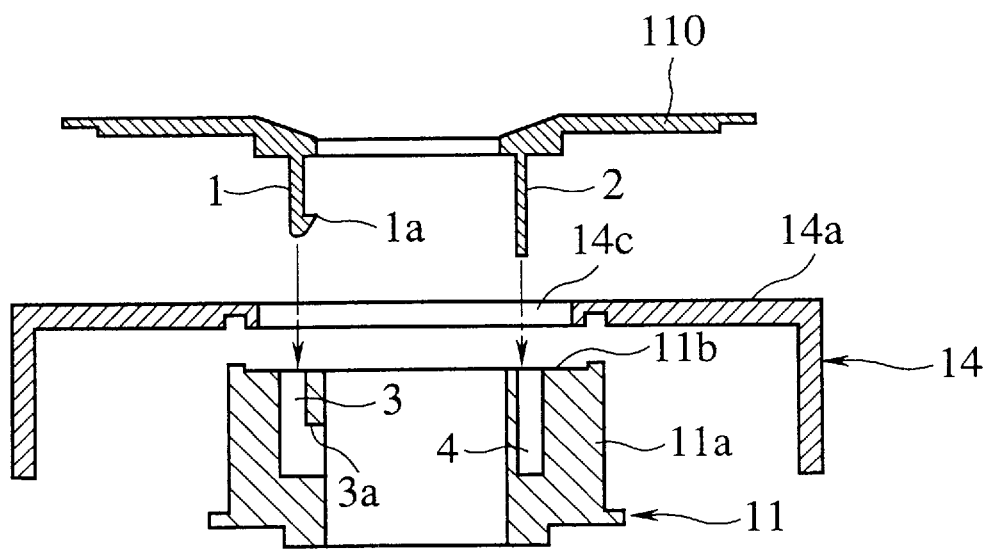
FIG. 2A is a cross sectional view showing a state before the securing structure shown in FIG. 1 is assembled.

FIG. 2A shows a state where the external connection cover 110 shown in FIG. 1 is attached to the inner cylindrical member 11a from a position above the upper cover member 14a of the cover member 14. When the external connection cover 110 is attached to the inner cylindrical member 11a, the engaging projections 1 and the locating projections 2 are inserted through the opening 14c so as to be inserted into the corresponding engaging-projection accommodation grooves 3 and the locating projection accommodation grooves 4 of the inner cylindrical member 11a. As a result, the hook portions 1a of the engaging projections 1 are engaged to the lock portions 3a of the engaging-projection accommodation grooves 3 so that the external connection cover 110 is attached to the inner cylindrical member 11a from a position above the upper cover member 14a of the cover member 14.

Therefore, the external connection cover 110 can easily be attached without tapping screws and the attaching operation can easily be performed. As a result, cost can be reduced. In a state where the external connection cover 110 has been attached to the inner cylindrical member 11a, the locating projections 2 are accommodated in the locating projection accommodation grooves 4 so that the engagement is performed without rattling of the external connection cover 110 in the circumferential direction. Moreover, the engagement between the hook portion 1a and the lock portion 3a enables the state of the engagement to reliably be maintained.

Figure 2B:
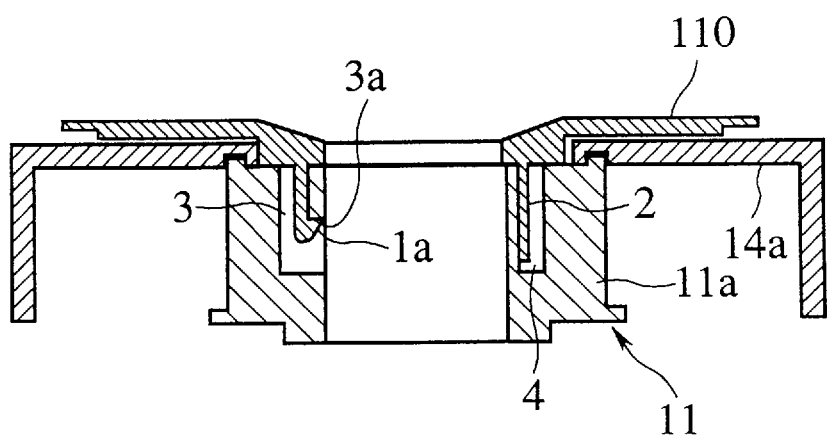
FIG. 2B is a cross sectional view showing a state where the securing structure shown in FIG. 1 has been assembled.

FIG. 2B is a cross sectional view showing a state where the elements shown in FIG. 2A have been assembled. In the state where the external connection cover 110 has been attached to the inner cylindrical member 11a, three locating projections 2 and the corresponding locating projection accommodation grooves 4 cause the external connection cover 110 to accurately be engaged to a predetermined position on the inner cylindrical member 11a without directional error in the circumferential direction or the radial direction.

Figure 3B:
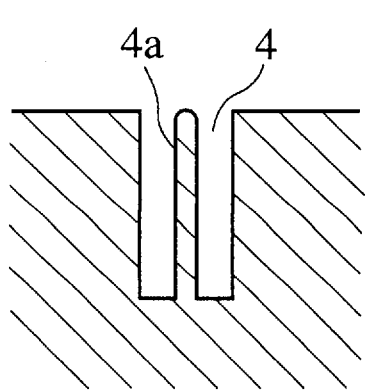
FIG. 3B is a partially enlarged cross sectional view showing another shape of the rib formed in the locating projection accommodating groove.
Figure 3C:
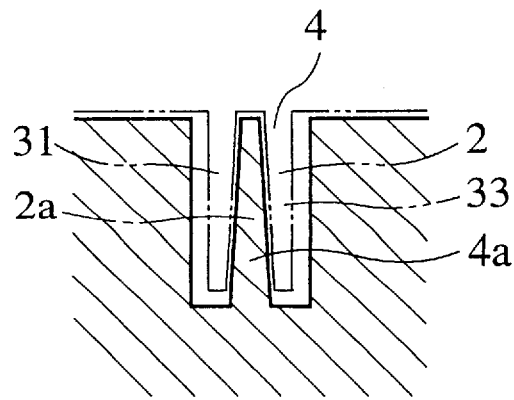
FIG. 3C is a partially enlarged cross sectional view showing another shape of the locating projections and the locating projection accommodating groove.

FIG. 3B is a partially enlarged cross sectional view showing another embodiment of the rib 4a provided for the locating projection accommodation grooves 4 for accommodating the locating projections 2. In this embodiment, the leading end of the rib 4a is formed into a rounded shape to permit the locating projections 2 to easily be inserted. FIG. 3C is a partially enlarged cross sectional view showing another embodiment of the locating projections 2 and the corresponding locating projection accommodation grooves 4. In this embodiment, the rib 4a is tapered toward the leading end thereof. Also the gap 2a between the parallel arms 31 and 33 (indicated by an alternate long and two short dashes line) is tapered to correspond to the tapered rib 4a. Each of the foregoing embodiments is arranged to easily insert the locating projections 2 into the locating projection accommodation grooves 4.

Although the description has been performed about the external connection cover 110 and the inner cylindrical member 11a of the reel type connection unit, the present invention may widely be applied as a structure for attaching a cover to another cylindrical body having a large wall thickness.

What is claimed is:

1. A rotary member, comprising:
    a cylindrical member;
    a cover;
    plural engaging projections projecting from a contact surface of said cover brought into contact with an end surface of said cylindrical member, each engaging projection having a hook portion at a leading end thereof;
    locating projections projecting from said contact surface, said locating projections including erect parallel arms spaced apart from one another to define a gap;
    engaging projection accommodating grooves formed in the end surface of said cylindrical member at positions corresponding to said engaging projections so as to accommodate and be engaged with said engaging projections; and
    locating projection accommodating grooves formed in the end surface of said cylindrical member at positions corresponding to said locating projections so as to accommodate said locating projections, said locating projection accommodating grooves including a rib engageable in the gap between said arms of said locating projections.

2. A rotary member according to claim 1, wherein said locating projections are formed in a plurality of positions on said contact surface.

3. A rotary member according to claim 2, wherein said engaging projections, said locating projections, said engaging projection accommodating grooves and said locating projection accommodating grooves are formed at positions or into shapes to permit said engaging projections to be accommodated in said engaging projection accommodating grooves and to permit said locating projections to be accommodated in said locating projection accommodating grooves only when said cover has been attached to said cylindrical member at a predetermined position.

4. A rotary member according to claim 1, wherein
    said engaging projection accommodating grooves have lock portions formed in an inner surface of said cylindrical member to receive and lock said hook portions.

5. A rotary member according to claim 1, wherein said ribs have an arcuate distal end.

6. A rotary member according to claim 1, wherein said ribs have a generally rectangular distal end.

7. A rotary member according to claim 1, wherein said locating projections have a tapered distal end.

8. A rotary member according to claim 1, wherein one of said plural engaging projections and corresponding engaging projection accommodating grooves has a first width, and another of said plural engaging projections and corresponding engaging projection accommodating grooves has a second width different from the first width.

9. A rotary member according to claim 1, further comprising an alignment mark positioned on one of said cylindrical member and said cover.

10. A rotary member, comprising:

an annular cylindrical member defining a first central opening;

an annular cover defining a second central opening;

at least three engaging projections projecting from a contact surface of said cover brought into contact with an end surface of said cylindrical member, each engaging projection being shaped substantially identical to the others and having a hook portion at the leading end thereof;

locating projections projecting from said contact surface;

at least three engaging projection accommodating grooves formed in the end surface of said cylindrical member at positions corresponding to said at least three engaging projections so as to accommodate and be engaged with said at least three engaging projections; and locating projection accommodating grooves formed in the end surface of said cylindrical member at positions corresponding to said locating projections so as to accommodate said locating projections, wherein one of said at least three engaging projections and corresponding engaging projections accommodating grooves has a first width, and the others of said at least three engaging projections and corresponding engaging projection accommodating grooves have a second width greater than said first width, so that said cover is attachable to said cylindrical member only at a predetermined position.

* * * * *